United States Patent
Chiang et al.

(10) Patent No.: US 12,347,967 B2
(45) Date of Patent: Jul. 1, 2025

(54) CHARGING CONNECTOR

(71) Applicant: Cheng Uei Precision Industry Co., LTD., New Taipei (TW)

(72) Inventors: Chih-Hsien Chiang, New Taipei (TW); Chun-Fu Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 440 days.

(21) Appl. No.: 18/092,244

(22) Filed: Dec. 31, 2022

(65) Prior Publication Data

US 2023/0327372 A1    Oct. 12, 2023

(30) Foreign Application Priority Data

Apr. 11, 2022   (CN) .................. 202220826076.X (51) Int. Cl.
*H01R 13/62*   (2006.01)

(52) U.S. Cl.
CPC .................................. *H01R 13/62* (2013.01)

(58) Field of Classification Search
CPC ....................................................... H01R 13/62
USPC ......................................................... 439/321
See application file for complete search history.

(56) References Cited

U.S. PATENT DOCUMENTS

| | | | | |
|---|---|---|---|---|
| 5,035,640 A * | 7/1991 | Drogo | ............... | H01R 13/622 439/321 |
| 5,145,394 A * | 9/1992 | Hager | ............... | H01R 13/622 439/321 |
| 5,785,545 A * | 7/1998 | Holt | ............... | H01R 13/62 439/321 |
| 6,086,400 A * | 7/2000 | Fowler | ............... | H01R 13/622 439/321 |
| 6,123,563 A * | 9/2000 | Johnson | ............... | H01R 13/622 439/321 |
| 6,152,753 A * | 11/2000 | Johnson | ............... | H01R 13/622 439/321 |
| 7,077,677 B2 * | 7/2006 | Sanuki | ............... | H01R 13/623 439/321 |
| 7,845,963 B2 * | 12/2010 | Gastineau | ............ | H01R 13/639 439/321 |
| 8,215,977 B2 * | 7/2012 | Zapf | ............... | H01R 13/625 439/352 |
| 8,328,574 B1 * | 12/2012 | Lin | ............... | H01R 13/639 439/321 |
| 8,992,148 B2 * | 3/2015 | Schafer | ............... | H01R 13/639 439/321 |
| 9,099,807 B2 * | 8/2015 | Opgenorth | ............ | H01R 13/62 |
| 11,476,608 B2 * | 10/2022 | Lin | ............... | H01R 13/112 |

(Continued)

*Primary Examiner* — Harshad C Patel (74) *Attorney, Agent, or Firm* — Cheng-Ju Chiang (57) ABSTRACT

A charging connector includes a housing, at least one terminal, a movable shell and a stopper. A middle of the housing has an internal insulator fixed in the housing. The at least one terminal is disposed in the internal insulator. The movable shell is rotatably disposed around an outer periphery of the housing, and the movable shell has a threaded guiding groove. The stopper is movably mounted around the housing. The stopper is moved between an unlocking position and a locking position. When the stopper is moved frontward to the locking position, the stopper is interfered with the movable shell to stop the movable shell from rotating.

7 Claims, 5 Drawing Sheets

(56) References Cited

U.S. PATENT DOCUMENTS

| | | | | |
|---|---|---|---|---|
| 2002/0048984 A1* | 4/2002 | Scholler | ............... | H01R 13/622 |
| | | | | 439/321 |
| 2006/0172580 A1* | 8/2006 | Scholler | ............. | H01R 13/5202 |
| | | | | 439/321 |
| 2007/0093109 A1* | 4/2007 | Czarnyszka | ......... | H01R 13/622 |
| | | | | 439/321 |
| 2010/0151717 A1* | 6/2010 | Bulow | ................. | H01R 13/639 |
| | | | | 439/321 |
| 2013/0072048 A1* | 3/2013 | Schafer | ................ | F16L 19/005 |
| | | | | 439/372 |
| 2014/0154906 A1* | 6/2014 | Lee | ..................... | H01R 13/622 |
| | | | | 439/321 |
| 2015/0024618 A1* | 1/2015 | Dovranic | ........... | H01R 13/6277 |
| | | | | 439/321 |
| 2016/0020552 A1* | 1/2016 | Strahl | ................ | H01R 13/622 |
| | | | | 439/321 |
| 2018/0026403 A1* | 1/2018 | Dang | ..................... | H01R 24/28 |
| | | | | 439/321 |
| 2023/0402791 A1* | 12/2023 | Chiang | ............. | H01R 13/5202 |

\* cited by examiner

CHARGING CONNECTOR

CROSS-REFERENCE TO RELATED APPLICATION

The present application is based on, and claims priority from, China Patent Application No. 202220826076.X, filed Apr. 11, 2022, the disclosure of which is hereby incorporated by reference herein in its entirety.

BACKGROUND OF THE INVENTION

1. Field of the Invention

The present invention generally relates to a charging connector, and more particularly to a charging connector which is less likely to get loose due to a vibration.

2. The Related Art

In order to facilitate a charging of an electric vehicle, a design of a charging connector with a higher voltage and a higher current becomes an important issue of an electric vehicle industry development. The charging connector is easily inserted into a docking connector or withdrawn from the docking connector. The charging connector is able to maintain a stable connection. Usually, the charging connector for the electric vehicle has a grip providing an operation convenience for a user, a charging section connected to the electric vehicle, and a locking section. The locking section is arranged to lock the charging connector with the docking connector of the electric vehicle during a charging process, so that the charging connector is prevented from accidentally getting loose in the charging process.

Figure 5:
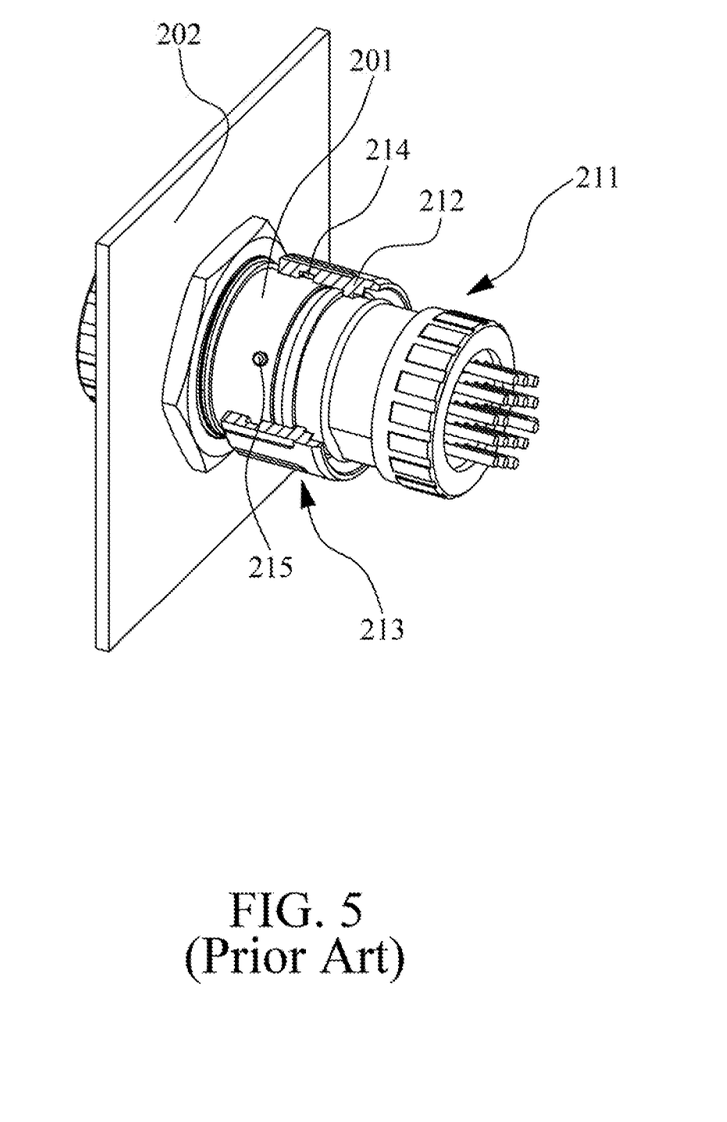
FIG. 5 is a partially cross-sectional view of a conventional charging connector in prior art.

Referring to FIG. 5, a conventional charging connector 201 is cooperated with a charging base 202 of the electric vehicle. The conventional charging connector 201 includes a charging section 211 and a locking section 212. The locking section 212 includes a ring-shape shell 213. The shell 213 is mounted around an outer periphery of the charging section 211. The shell 213 is able to rotate around the charging section 211. A front end of the shell 213 has a threaded guiding slot 214. The threaded guiding slot 214 is locked with a protrusion 215 of the charging base 202. The threaded guiding slot 214 is provided for locking the shell 213 with the charging base 202 of the electric vehicle. However, in practice, the locking section 212 is fastened to the charging base 202 by a friction force between the charging base 200 and the charging section 211 of the conventional charging connector 201, so the conventional charging connector 201 gets loose easily during a vibration.

Therefore, it is necessary to design a charging connector which is less likely to get loose due to a vibration.

SUMMARY OF THE INVENTION

An object of the present invention is to provide a charging connector which is less likely to get loose due to a vibration. The charging connector includes a housing, at least one terminal, a movable shell and a stopper. A middle of the housing has an internal insulator fixed in the housing. The at least one terminal is disposed in the internal insulator. The movable shell is rotatably disposed around an outer periphery of the housing, and the movable shell has a threaded guiding groove. The stopper is movably mounted around the housing. The stopper is moved between an unlocking position and a locking position. When the stopper is moved frontward to the locking position, the stopper is interfered with the movable shell to stop the movable shell from rotating.

Another object of the present invention is to provide a charging connector mating with a charging base having a protrusion. The charging connector includes a housing, at least one terminal, a movable shell, a stopper and a nut. A middle of the housing has an internal insulator fixed in the housing. Two portions of an outer peripheral surface of the housing protrude outward to form two flexible bridges. An outer surface of each flexible bridge protrudes outward to form a guiding block. The at least one terminal is disposed in the internal insulator. The movable shell is rotatably disposed around a front of an outer periphery of the housing, and the movable shell has a threaded guiding groove formed at a front of an inner surface of the movable shell. The threaded guiding groove is engaged with the protrusion of the charging base. The stopper is movably mounted around the housing. The stopper is moved between an unlocking position and a locking position. The stopper is positioned at a rear end of the movable shell. An inner surface of the stopper is recessed inward to form a positioning groove. A guiding rail is positioned in the positioning groove. The nut is mounted at a rear of the housing. The nut is located behind the stopper to restrict the movable shell and the stopper. When the stopper is moved to the locking position, the stopper is interfered with the movable shell to stop the movable shell from rotating. When the stopper is moved to the locking position, the two guiding blocks are engaged with front surfaces of the two guiding rails, and the two guiding blocks are accommodated in two fronts of the two positioning grooves. When the stopper is moved to the unlocking position, the two guiding blocks are engaged with rear surfaces of the two guiding rails, and the two guiding blocks are accommodated in two rears of the two positioning grooves.

Another object of the present invention is to provide a charging connector mating with a charging base having a protrusion. The charging connector includes a housing, at least one terminal, a movable shell and a stopper. A middle of the housing has an internal insulator fixed in the housing. The at least one terminal is disposed in the internal insulator. The at least one terminal is connected with the charging base. The movable shell is rotatably disposed around an outer periphery of the housing, and the movable shell has a threaded guiding groove for engaging with the protrusion of the charging base. Several portions of a front end of a periphery of an inner surface of the movable shell protrude inward to form a plurality of buckling blocks. The stopper is movably mounted around the housing. The stopper is moved between an unlocking position and a locking position. The stopper has a main body. The main body is formed in a ring shape. The main body is mounted around an outer peripheral surface of the housing. Several portions of a front end of the main body are recessed inward to form a plurality of buckling grooves. When the stopper slides towards the movable shell to move to the locking position, the plurality of the buckling blocks are engaged with the plurality of the buckling grooves to prevent the movable shell from rotating, and the threaded guiding groove is prevented loosing from the protrusion of the charging base, when the stopper slides away from the movable shell to the unlocking position, the plurality of the buckling blocks are separated from the plurality of the buckling grooves to ensure that the movable shell is able to rotate, the threaded guiding groove is freely locked with or unlocked from the protrusion of the charging base.

As described above, the stopper of the charging connector is mounted at a rear end of the movable shell to limit a rotation of the movable shell by an interference of the movable shell and the stopper, so the charging connector is less likely to get loose due to a vibration.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
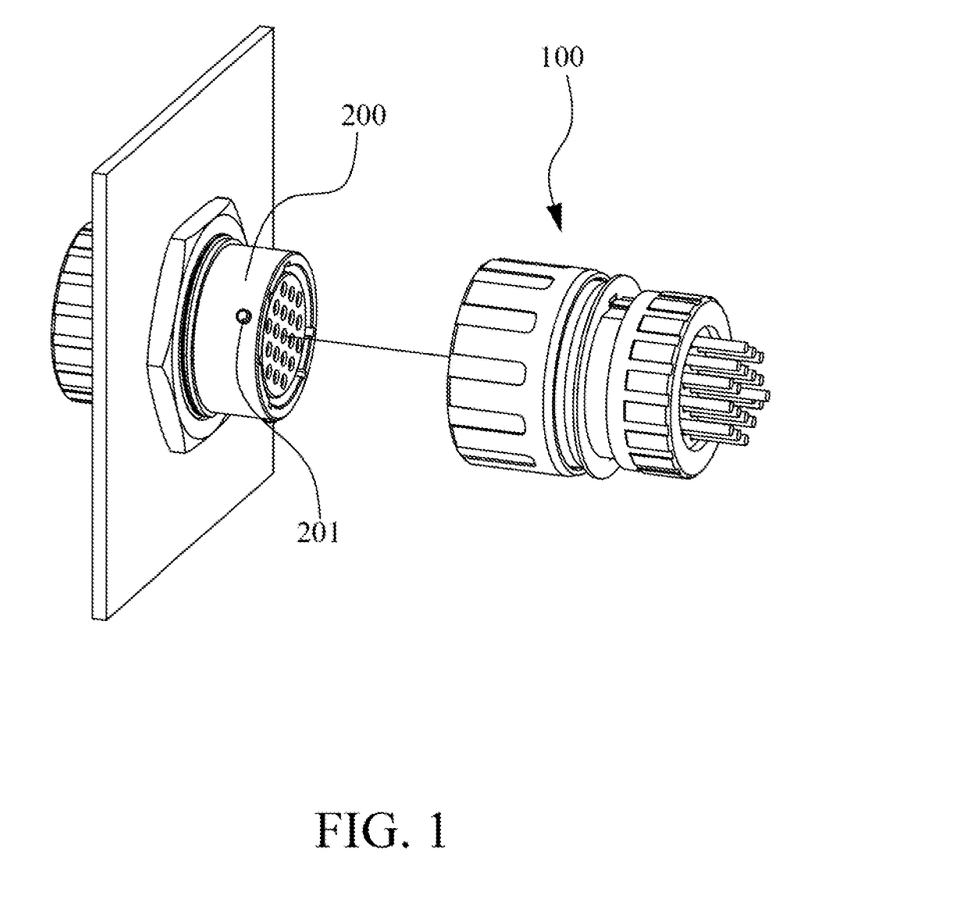
FIG. 1 is a perspective view of a charging connector and a charging base in accordance with a preferred embodiment of the present invention.
Figure 2:
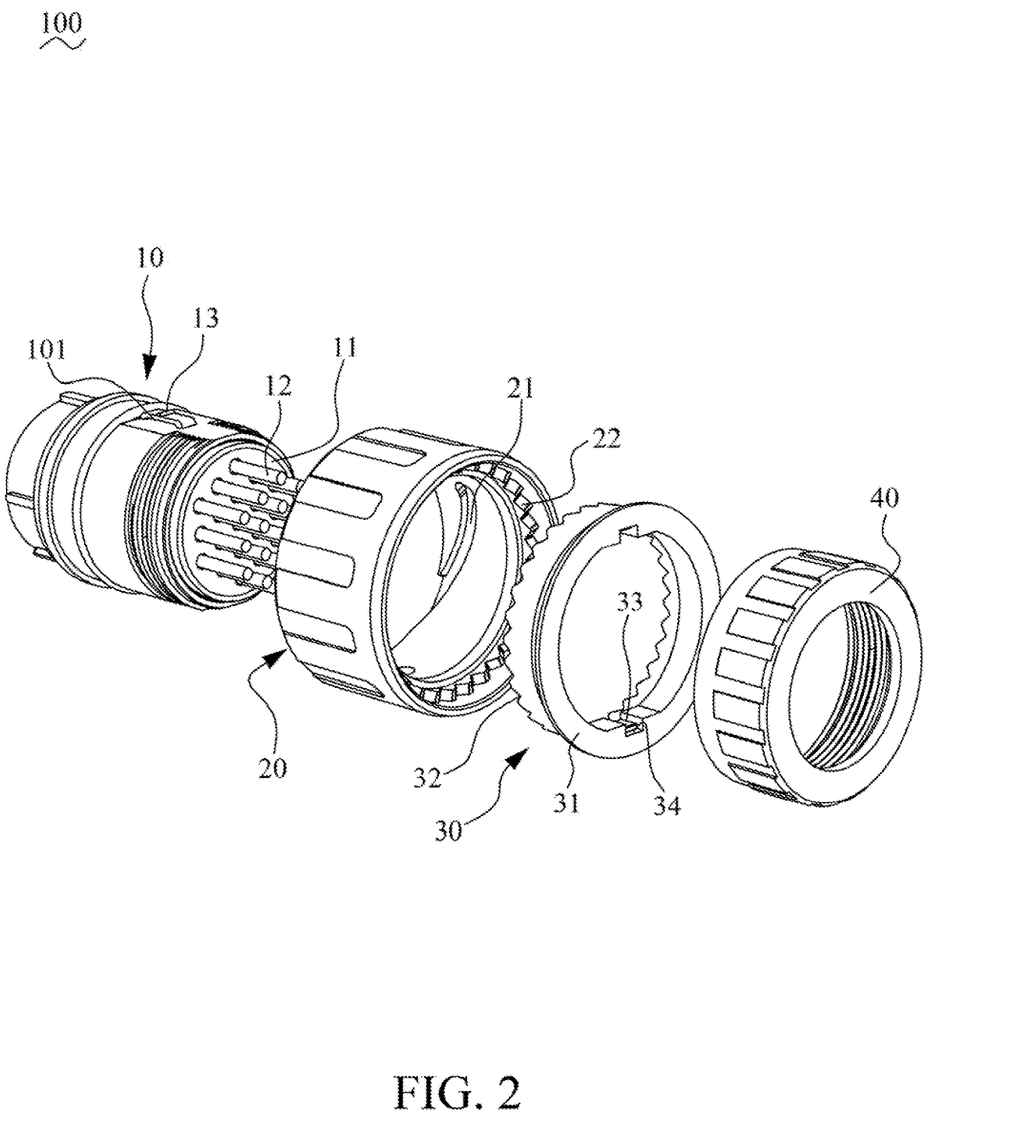
FIG. 2 is an exploded view of the charging connector in accordance with the preferred embodiment of the present invention.

Referring to FIG. 1 and FIG. 2, a charging connector 100 in accordance with a preferred embodiment of the present invention is shown. The charging connector 100 includes a housing 10, at least one terminal 12, a movable shell 20, a stopper 30 and a nut 40.

The housing 10 is formed in a cylinder shape. A middle of the housing 10 has an internal insulator 11 fixed in the housing 10. The at least one terminal 12 is disposed in the internal insulator 11 to be matched with a charging base 200 of an electric vehicle (not shown). The at least one terminal 12 is connected with the charging base 200 of the electric vehicle. The movable shell 20 is formed in a circle shape. The movable shell 20 is rotatably disposed around a front of an outer periphery of the housing 10. The movable shell 20 has a threaded guiding groove 21 formed at a front of an inner surface of the movable shell 20. The threaded guiding groove 21 is engaged with a protrusion 201 of the charging base 200. The threaded guiding groove 21 is used for engaging with the protrusion 201 of the charging base 200. The threaded guiding groove 21 is disposed at one end of the inner surface of the movable shell 20 which is adjacent to the charging base 200. The threaded guiding groove 21 is matched with the protrusion 201 of the charging base 200. The threaded guiding groove 21 is locked with the protrusion 201 of the charging base 200. The charging connector 100 mates with the charging base 200 having the protrusion 201.

The stopper 30 is movably mounted around the housing 10. The stopper 30 is moved between an unlocking position and a locking position. The stopper 30 is moved frontward or rearward along an insertion direction of the charging connector 100. The nut 40 is mounted around the housing 10. The nut 40 is mounted at a rear of the housing 10. The nut 40 is located behind the stopper 30 to restrict the movable shell 20 and the stopper 30. When the stopper 30 is moved frontward to the locking position, the stopper 30 is interfered with the movable shell 20 to stop the movable shell 20 from rotating.

Figure 3:
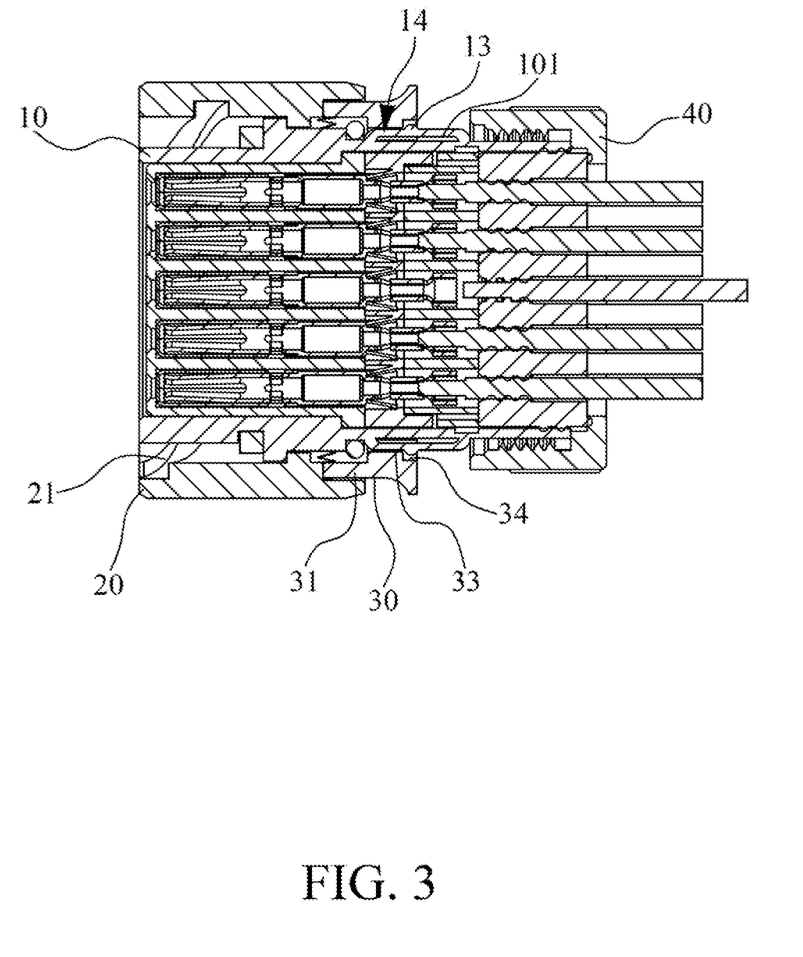
FIG. 3 is a cross-sectional view of the charging connector, wherein a stopper of the charging connector is moved to a locking position of the charging connector in accordance with the preferred embodiment of the present invention.
Figure 4:
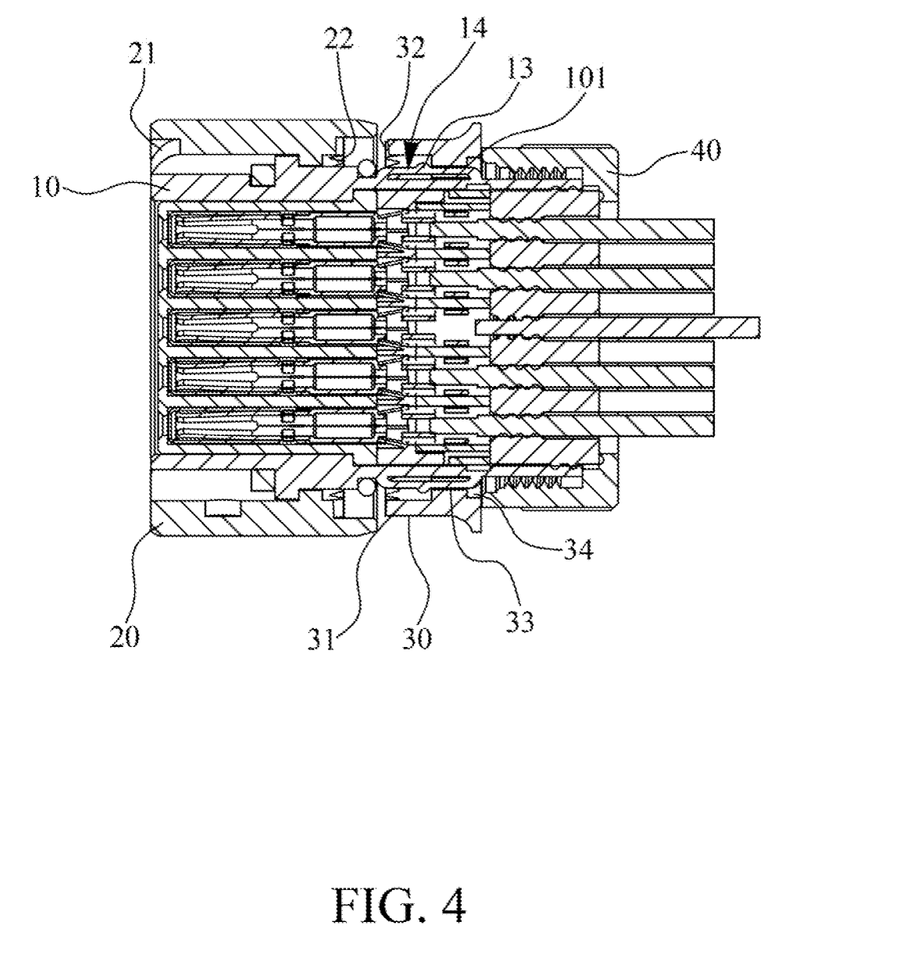
FIG. 4 is a cross-sectional view of the charging connector, wherein the stopper of the charging connector is moved to an unlocking position of the charging connector in accordance with the preferred embodiment of the present invention.

Referring to FIG. 2 to FIG. 4, in the preferred embodiment, several portions of a periphery of a front end of an inner surface of the movable shell 20 protrude inward to form a plurality of buckling blocks 22. The plurality of the buckling blocks 22 are axis-symmetric with respect to a center axis of the housing 10. The plurality of the buckling blocks 22 are protruded towards the stopper 30. Two portions of an outer peripheral surface of the housing 10 protrude outward to form two flexible bridges 14. A middle of an outer surface of each flexible bridge 14 protrudes outward to form a guiding block 13. A middle portion of each flexible bridge 14 is separated from the outer peripheral surface of the housing 10 to define a space 101 between the middle portion of each flexible bridge 14 and the outer peripheral surface of the housing 10.

The stopper 30 has a main body 31. The main body 31 is formed in a ring shape. The main body 31 is mounted around the outer peripheral surface of the housing 10. The stopper 30 is positioned at a rear end of the movable shell 20. An inner surface of the stopper 30 is recessed inward to form a positioning groove 34. A guiding rail 33 is positioned in the positioning groove 34. Two portions of an inner surface of the main body 31 are recessed inward to form two positioning grooves 34. Two middles of two inner surfaces of the two positioning grooves 34 protrude inward to form two guiding rails 33. The two guiding rails 33 project into the two positioning grooves 34, respectively.

The two guiding blocks 13 of the two flexible bridges 14 are matched with the two guiding rails 33. The two guiding blocks 13 of the two flexible bridges 14 are engaged with the two guiding rails 33. The two positioning grooves 34 are matched with the two flexible bridges 14. The two guiding blocks 13 of the two flexible bridges 14 are slid along surfaces of the two guiding rails 33 for guiding the main body 31 to slide on the outer peripheral surface of the housing 10 along the center axis of the housing 10. Several portions of a front end of the main body 31 are recessed inward to form a plurality of buckling grooves 32. The plurality of the buckling grooves 32 are assembled with the plurality of the buckling blocks 22. The plurality of the buckling grooves 32 are engaged with the plurality of the buckling blocks 22.

Referring to FIG. 3 and FIG. 4, when the stopper 30 slides towards the movable shell 20 to move to the locking position, the plurality of the buckling blocks 22 are engaged with the plurality of the buckling grooves 32 to prevent the movable shell 20 from rotating, and the threaded guiding groove 21 is prevented loosing from the protrusion 201 of the charging base 200. When the stopper 30 slides away from the movable shell 20 to the unlocking position, the plurality of the buckling blocks 22 are separated from the plurality of the buckling grooves 32 to ensure that the movable shell 20 is able to rotate, the threaded guiding groove 21 is freely locked with or unlocked from the protrusion 201 of the charging base 200.

Referring to FIG. 3 and FIG. 4, in order to further ensure a stability of the stopper 30, and to prevent the stopper 30 from accidentally switching between the locking position and the unlocking position, the two middles of the two outer surfaces of the two flexible bridges 14 of the housing 10 protrude outward to form the two guiding blocks 13. Each flexible bridge 14 is arranged on the outer peripheral surface of the housing 10. Two ends of each flexible bridge 14 protrude towards the outer peripheral surface of the housing

10. Two ends of each flexible bridge 14 are connected to the outer peripheral surface of the housing 10, so that a middle of each flexible bridge 14 remains suspended, and each guiding block 13 is formed at an outer surface of the middle of one flexible bridge 14, so that each flexible bridge 14 will be deformed inward at the time of each guiding block 13 being exerted by a pressure of the guiding rail 33 of the stopper 30.

When the stopper 30 is moved to the locking position, the two guiding blocks 13 are engaged with front surfaces of the two guiding rails 33, and the two guiding blocks 13 are accommodated in two fronts of the two positioning grooves 34. When the stopper 30 is moved to the unlocking position, the two guiding blocks 13 are engaged with rear surfaces of the two guiding rails 33, and the two guiding blocks 13 are accommodated in two rears of the two positioning grooves 34, so that the stopper 30 is held in the locking position or the unlocking position.

As described above, the stopper 30 of the charging connector 100 is mounted at the rear end of the movable shell 20 to limit a rotation of the movable shell 20 by an interference of the movable shell 20 and the stopper 30, so the charging connector 100 is less likely to get loose due to a vibration.

What is claimed is:

1. A charging connector, comprising:
   a housing, a middle of the housing having an internal insulator fixed in the housing;
   at least one terminal disposed in the internal insulator;
   a movable shell rotatably disposed around an outer periphery of the housing, and the movable shell having a threaded guiding groove; and
   a stopper movably mounted around the housing, the stopper being moved between an unlocking position and a locking position;
   wherein when the stopper is moved frontward to the locking position, the stopper is interfered with the movable shell to stop the movable shell from rotating.

2. The charging connector as claimed in claim 1, wherein several portions of a rear end of a periphery of an inner surface of the movable shell protrude inward to form a plurality of buckling blocks, the stopper has a main body, the main body is formed in a ring shape, the main body is mounted around an outer peripheral surface of the housing, several portions of a front end of the main body are recessed inward to form a plurality of buckling grooves, the plurality of the buckling grooves are assembled with the plurality of the buckling blocks, the plurality of the buckling grooves are engaged with the plurality of the buckling blocks.

3. The charging connector as claimed in claim 1, wherein two portions of an outer peripheral surface of the housing protrude outward to form two flexible bridges, a middle of an outer surface of each flexible bridge protrudes outward to form a guiding block, the two portions of the inner surface of the main body are recessed inward to form two positioning grooves, two middles of two inner surfaces of the two positioning grooves protrude inward to form two guiding rails, the two guiding rails project into the two positioning grooves, respectively, the two guiding blocks of the two flexible bridges are matched with the two guiding rails, the two guiding blocks of the two flexible bridges are engaged with the two guiding rails.

4. The charging connector as claimed in claim 3, wherein a middle portion of each flexible bridge is separated from the outer peripheral surface of the housing to define a space between the middle portion of each flexible bridge and the outer peripheral surface of the housing, the two guiding rails are positioned in the two positioning grooves, respectively, the two guiding blocks are engaged with rears of the two guiding rails, and the two guiding blocks are accommodated in the two positioning grooves, when the stopper is moved to the locking position, the two guiding blocks are engaged with front surfaces of the two guiding rails, and the two guiding blocks are accommodated in two fronts of the two positioning grooves, when the stopper is moved to the unlocking position, the two guiding blocks are engaged with rear surfaces of the two guiding rails, and the two guiding blocks are accommodated in two rears of the two positioning grooves.

5. The charging connector as claimed in claim 3, wherein two ends of each flexible bridge are connected to the outer peripheral surface of the housing, so that a middle of each flexible bridge remains suspended, and each guiding block is formed at an outer surface of the middle of one flexible bridge.

6. A charging connector mating with a charging base having a protrusion, comprising:
   a housing, a middle of the housing having an internal insulator fixed in the housing, two portions of an outer peripheral surface of the housing protruding outward to form two flexible bridges, an outer surface of each flexible bridge protruding outward to form a guiding block;
   at least one terminal disposed in the internal insulator;
   a movable shell rotatably disposed around a front of an outer periphery of the housing, and the movable shell having a threaded guiding groove formed at a front of an inner surface of the movable shell, the threaded guiding groove being engaged with the protrusion of the charging base;
   a stopper movably mounted around the housing, the stopper being moved between an unlocking position and a locking position, the stopper being positioned at a rear end of the movable shell, an inner surface of the stopper being recessed inward to form a positioning groove, a guiding rail being positioned in the positioning groove; and
   a nut mounted at a rear of the housing, the nut being located behind the stopper to restrict the movable shell and the stopper;
   wherein when the stopper is moved to the locking position, the stopper is interfered with the movable shell to stop the movable shell from rotating;
   wherein when the stopper is moved to the locking position, the two guiding blocks are engaged with front surfaces of the two guiding rails, and the two guiding blocks are accommodated in two fronts of the two positioning grooves; and
   wherein when the stopper is moved to the unlocking position, the two guiding blocks are engaged with rear surfaces of the two guiding rails, and the two guiding blocks are accommodated in two rears of the two positioning grooves.

7. A charging connector mating with a charging base having a protrusion, comprising:
   a housing, a middle of the housing having an internal insulator fixed in the housing;
   at least one terminal disposed in the internal insulator, the at least one terminal being connected with the charging base;
   a movable shell rotatably disposed around an outer periphery of the housing, and the movable shell having a threaded guiding groove for engaging with the protrusion of the charging base, several portions of a front end of a periphery of an inner surface of the movable shell protruding inward to form a plurality of buckling blocks; and a stopper movably mounted around the housing, the stopper being moved between an unlocking position and a locking position, the stopper having a main body, the main body being formed in a ring shape, the main body being mounted around an outer peripheral surface of the housing, several portions of a front end of the main body being recessed inward to form a plurality of buckling grooves;

wherein when the stopper slides towards the movable shell to move to the locking position, the plurality of the buckling blocks are engaged with the plurality of the buckling grooves to prevent the movable shell from rotating, and the threaded guiding groove is prevented loosing from the protrusion of the charging base, when the stopper slides away from the movable shell to the unlocking position, the plurality of the buckling blocks are separated from the plurality of the buckling grooves to ensure that the movable shell is able to rotate, the threaded guiding groove is freely locked with or unlocked from the protrusion of the charging base.

* * * * *